United States Patent
Wendt et al.

(10) Patent No.: US 7,286,384 B2
(45) Date of Patent: Oct. 23, 2007

(54) AUTOMATIC RESOURCE ASSIGNMENT IN STACKED MODULE DEVICES

(75) Inventors: Michael Wendt, Haselbachtal (DE); Frank Schneider, Radeberg (DE); Frank Edelhaeuser, Dresden (DE); Helmut Prengel, Burkau (DE)

(73) Assignees: Advanced Micro Devices, Inc., Sunnyvale, CA (US); Spansion LLC, Sunnyvale, CA (US)

( * ) Notice: Subject to any disclaimer, the term of this patent is extended or adjusted under 35 U.S.C. 154(b) by 157 days.

(21) Appl. No.: 11/158,509

(22) Filed: Jun. 22, 2005

(65) Prior Publication Data

US 2006/0202712 A1    Sep. 14, 2006

(30) Foreign Application Priority Data

Mar. 11, 2005    (DE) .................... 10 2005 011 369

(51) Int. Cl.
    *G11C 5/06* (2006.01)
(52) U.S. Cl. .................... 365/63; 257/686; 365/51; 365/191; 365/230.06
(58) Field of Classification Search ............... 257/686; 361/735; 365/63, 191, 230.06, 51, 230.01, 365/230.08, 230.02; 711/5, 6, 200, 202, 711/210
    See application file for complete search history.

(56) References Cited

U.S. PATENT DOCUMENTS 5,963,464 A * 10/1999 Dell et al. .................... 365/52

| 6,269,411 | B1 * | 7/2001 | Reasoner .................... 710/9 |
|-----------|------|--------|------------------------------------|
| 6,469,375 | B2 * | 10/2002 | Beausoleil et al. ......... 257/686 |
| 6,734,474 | B2 * | 5/2004 | Frankowsky ................ 257/209 |
| 6,913,471 | B2 * | 7/2005 | Smith .......................... 439/74 |
| 7,123,497 | B2 * | 10/2006 | Matsui et al. ................ 365/63 |
| 2006/0206745 | A1 * | 9/2006 | Prengel et al. ............. 713/600 |

FOREIGN PATENT DOCUMENTS

DE    10059024    8/2001

OTHER PUBLICATIONS

Translation of Official Communication, Application No. 10 2005 011 369.9-53. Dec. 27, 2005.*
74F283 Data Sheet dated Apr. 1988, revised Jan. 2004. Retrieved from www.fairchildsemi.com.*
International search report application No. DE 10 2005 011 369.9-53 issued Jan. 18, 2007.
Translation of Official Communication in German Application No. 10 2005 011 369.9-53 issues Jun. 11, 2007.

* cited by examiner

*Primary Examiner*—Richard T. Elms
*Assistant Examiner*—Alexander Sofocleous
(74) *Attorney, Agent, or Firm*—Meyertons Hood Kivlin Kowert & Goetzel, P.C.; B. Noël Kivlin (57) ABSTRACT

A stacked module device and corresponding module and method are provided where at least some modules have input ports connected to receive first resource related signals and output ports connected to provide second resource related signals. The first and second signals are different, and each module comprises a resource signal transformation unit for generating the second signal from the first signals. The resource signal transformation units of each module are of the same construction. Resources may be addresses. Further, a software configurable address assignment is provided.

22 Claims, 7 Drawing Sheets

AUTOMATIC RESOURCE ASSIGNMENT IN STACKED MODULE DEVICES

BACKGROUND OF THE INVENTION

1. Field of the Invention

The invention generally relates to devices having stacked modules, and to corresponding stackable modules and operation methods, and in particular to the assignment of resources in such devices.

2. Description of the Related Art

Stacked module devices exist where a number of compatible modules are stacked onto a host board. The modules may be PCBs (Printed Circuit Boards) which are placed one on top of the other, but the modules may also be single chips, or larger groups of components. In any case, a module has a bottom connector to connect to the neighboring module located below the respective module, and a top connector to connect to the next upper module.

Such stacked module devices often receive resource related signals from the very bottom. Resource signals may in this context be, for instance, clock signals, chip select signals, or address signals. The lowest module receives the signals and feeds the signals through to the next module which is located upwards. This module does substantially the same, i.e., it forwards the received signals to the next upper module. By this scheme, all of the modules are enabled to access the resources.

Figure 1:
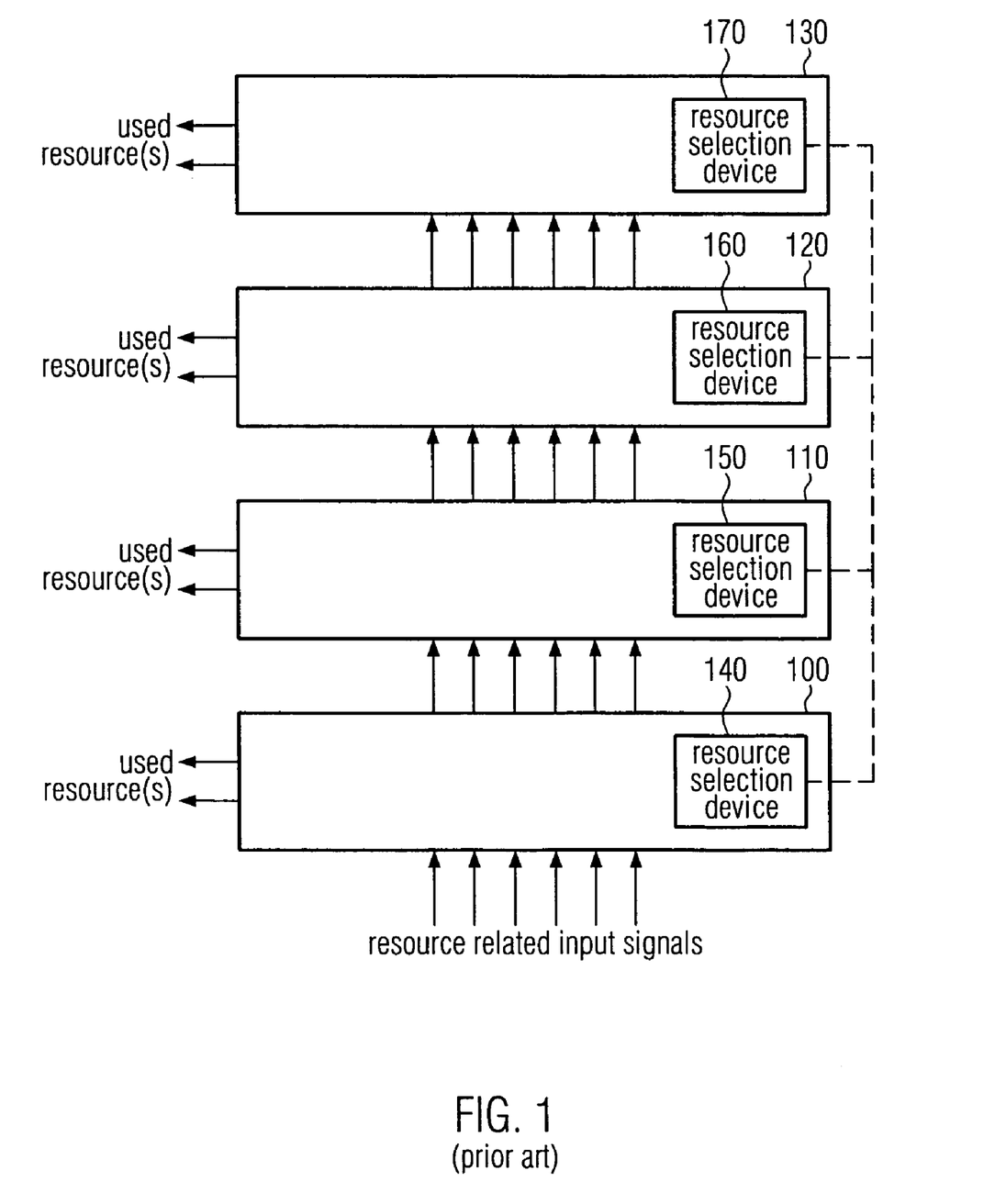
FIG. 1 illustrates a conventional stacked module device having four modules.

FIG. 1 depicts a conventional stacked module device having four modules 100-130. In the example of FIG. 1, six resource related input signals are fed through the modules, thereby forming a signal bus. As apparent from FIG. 1, each module may use one or more of the resources, for instance to synchronize to a specific clock, to use specific chip select signals, or to be addressable at a given address, or access a separate memory (not shown) at a given address.

However, there may be a resource conflict if two or more modules 100-130 access the same resources. For that reason, each module 100-130 requires an individual resource selection device 140-170 to assign resources to the respective stack position. The resource selection devices 140-170 may be preconfigured, or there may be an extra signalling bus connecting the resource selection devices to each other, allowing the devices 140-170 to communicate to each other in order to avoid a conflict.

However, the necessity to provide selection devices on every stack position is often found to be detrimental since this involves additional hardware efforts and reduces flexibility. Moreover, adding a further module to the stack may require a reconfiguration of the existing modules in the stack. This may further reduce the reliability of the entire system.

SUMMARY OF THE INVENTION

An improved device having stacked modules, and a corresponding module and method are provided that may improve reliability and operating range and further reduce the component parts.

In an embodiment, a device having stacked modules is provided where at least some of the modules have input ports connected to receive first resource related signals from a first neighboring module, and output ports connected to provide second resource related signals to a second neighboring module. The second resource related signals are different from the first resource related signals. Each one of the at least some modules comprise a resource signal transformation unit, which is adapted to generate the second resource related signals from the first resource related signals. The resource signal transformation unit of each one of the at least some modules are of the same construction.

In a further embodiment, a module which is stackable into or onto a module stack device is provided. The stackable module has input ports connected to receive first resource related signals from a first neighboring module, and output ports connected to provide second resource related signals to a second neighboring module. The second resource related signals are different from the first resource related signals. Each one of the at least some modules comprise a resource signal transformation unit which is adapted to generate the second resource related signals from the first resource related signals. The resource signal transformation units of each one of the at least some modules are of the same construction.

In yet another embodiment there is provided a method of operating a device having stacked modules. The method comprises, in at least some of the modules, receiving first resource related signals at input ports of the respective module from a first neighboring module, generating second resource related signals from the first resource related signals where the second resource related signals are different from the first resource related signals, and providing the second resource related signals at output ports of the respective module to a second neighboring module. Generating the second resource related signals from the first resource related signals comprises operating a resource signal transformation unit which is of the same construction in each one of the at least some modules.

In still a further embodiment, a method of operating a device having stacked modules is provided. The method comprises receiving, in a first module, a first address signal, and accessing the first module at an address represented by the first address signal. The method further comprises configuring a software configurable address assignment unit of the first module to output a second address signal to a second module. The method further comprises receiving in the second module the second address signal and accessing the second module at an address represented by the second address signal.

According to a further embodiment, there is provided a device having a stack of modules. At least some of the modules have one or more input terminals to receive a first number of address bits and one or more output terminals to output a second number of address bits. The at least some modules comprise means adapted to determine the second number of address bits.

According to still a further embodiment, a method of operating a stack of modules is provided where at least some of the modules perform the step of receiving a first number of address bits, determining a second number of address bits, and outputting the second number of address bits.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following and more particular description of the invention, as illustrated in the accompanying drawings, wherein.

DETAILED DESCRIPTION OF THE INVENTION

The illustrative embodiments of the present invention will be described with reference to the figure drawings wherein like elements and structures are indicated by like reference numbers.

Referring now to the drawings, a number of embodiments will be described, allowing for automatic, configuration-free resource assignment in stacked bus systems or other stacked module devices.

In an embodiment, the modules take the first one or first ones of the input signals from the bottom connector, i.e., the connector which is directed to the host board. The module then shifts the resource vector by the amount of resources used by the module.

Figure 2:
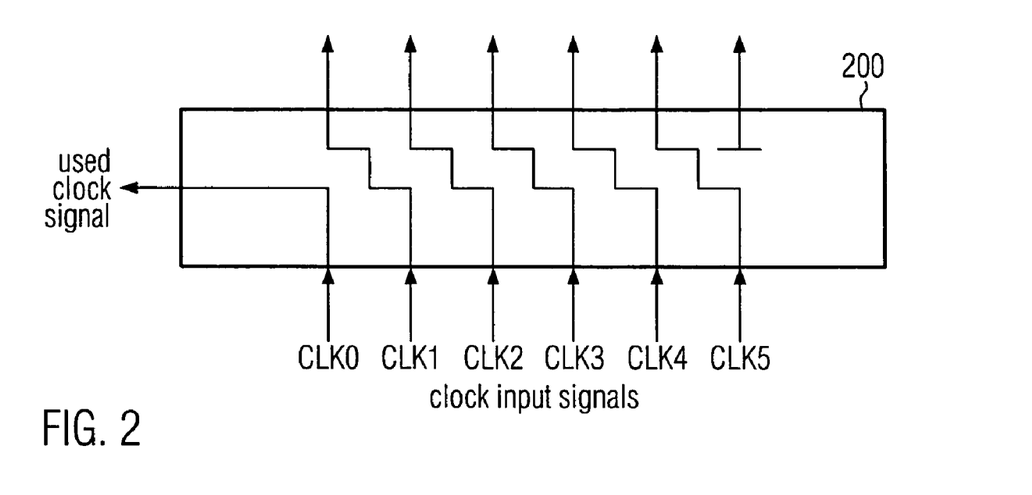
FIG. 2 illustrates a stackable module according to an embodiment.

FIG. 2 depicts an example where the resource related signals are clock signals. The module 200 uses the first clock signal CLK0 and shifts the remaining clock input signals by one position. That is, what was received as signal CLK1 will be supplied to the next module as CLK0. The highest clock signal to be provided to the next module is connected to a predefined signal source, such as ground.

Figure 3:
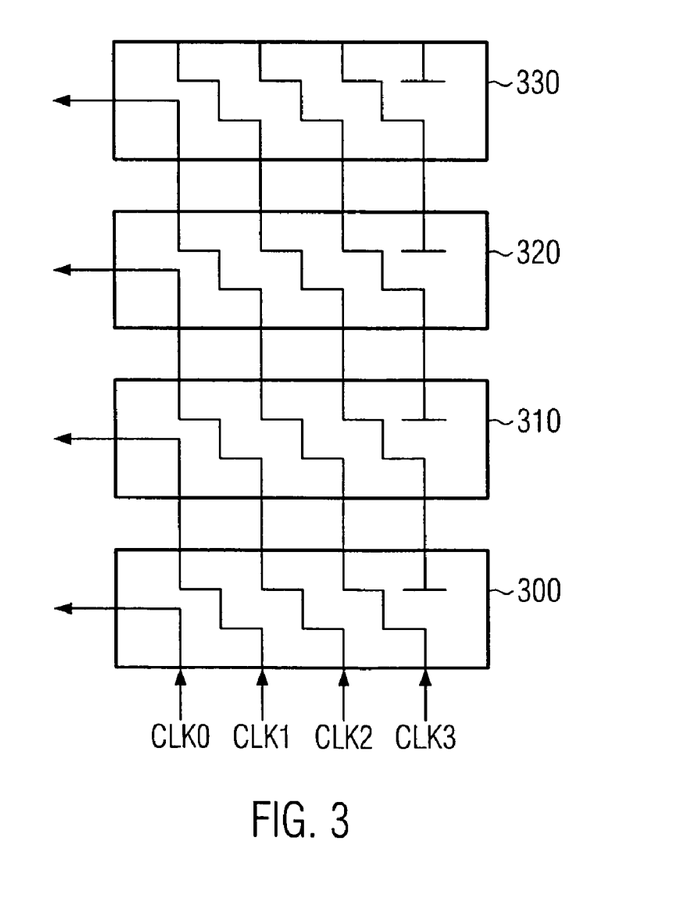
FIG. 3 illustrates a stacked module device according to an embodiment.

FIG. 3 illustrates a device having four modules as discussed above. However, in the embodiment of FIG. 3, the number of clock input signals is reduced to four. As apparent from the figure, each module is of the same construction and has no hardware consuming resource selection device. Nevertheless, each module uses a different clock signal, thus avoiding a resource conflict.

In the example of FIG. 3, each module uses the clock signal received at its first input port. By forwarding the clock signal received at the second input port to the first output port, each module assigns the respective clock signal to the next module in the stack. That is, each module has a connection between the second input port and the first output port, and this connection works as assignment means to assign the respective clock resource to the respective next module.

Further, to allow the remaining modules to properly assign the respective resource, each module further transfers the signals received at the remaining input ports to the respective shifted output ports. That is, module 300 has signal transfer means to forward the third clock input signal CLK2 received at the third input port to the second output port, thereby enabling module 310 to assign this clock signal to module 320.

Figure 4:
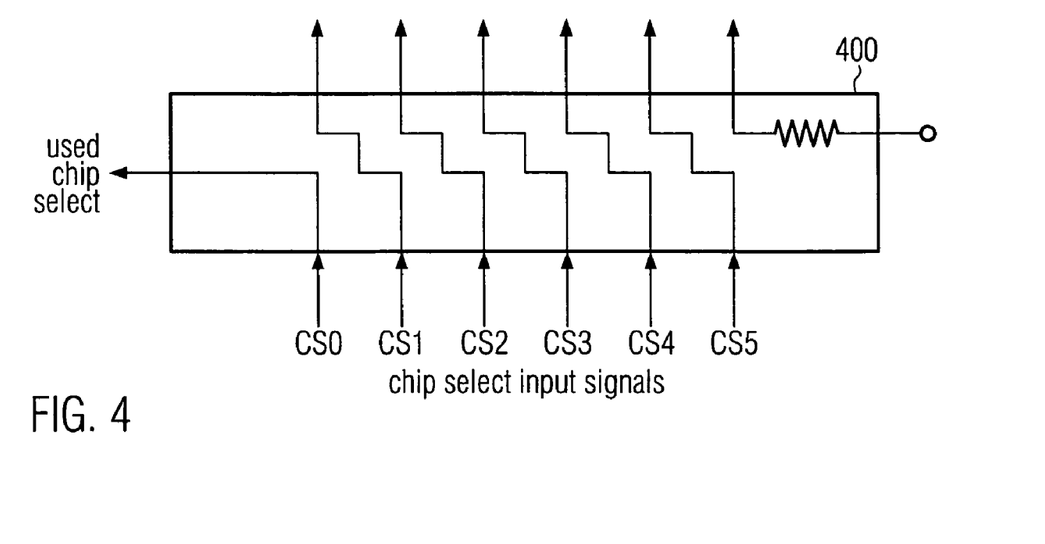
FIG. 4 illustrates a stackable module according to another embodiment.
Figure 5:
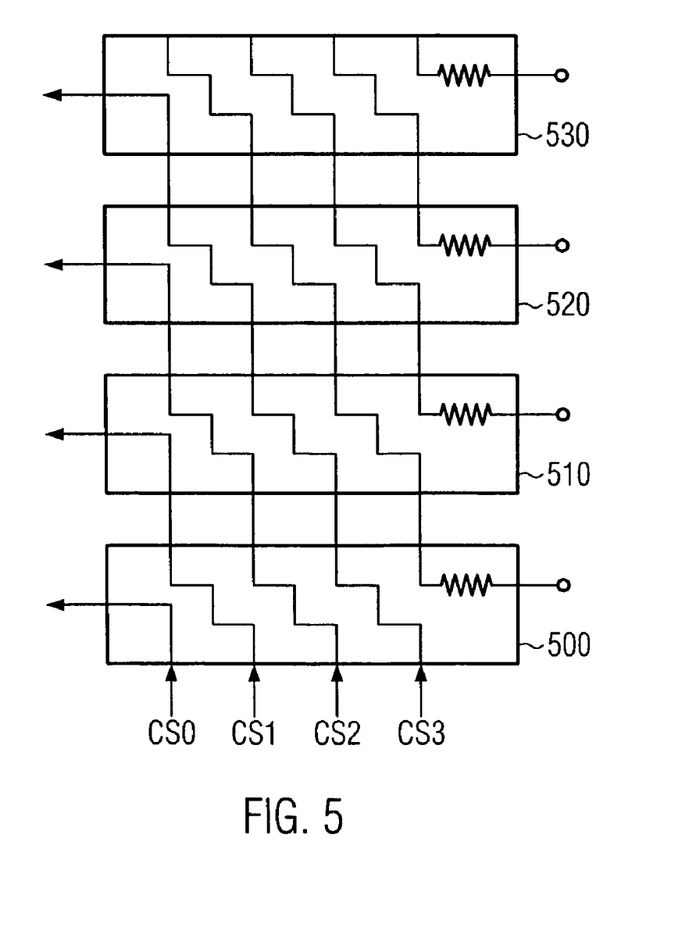
FIG. 5 illustrates a stacked module device according to another embodiment.

Another embodiment is described in FIGS. 4 and 5. The resource related input signals of these embodiments are chip select signals. Again, each module uses one chip select signal so that the remaining signals are shifted by one port position. The highest output port is then connected to a predefined signal source which is shown in FIGS. 4 and 5 to be outside the respective module, but which may also be provided within the respective module.

As described above, the resources are automatically assigned by allowing each module to take out as many resource related input signals as it needs and forward all remaining signals, being shifted, to the next upper module.

Figure 6:
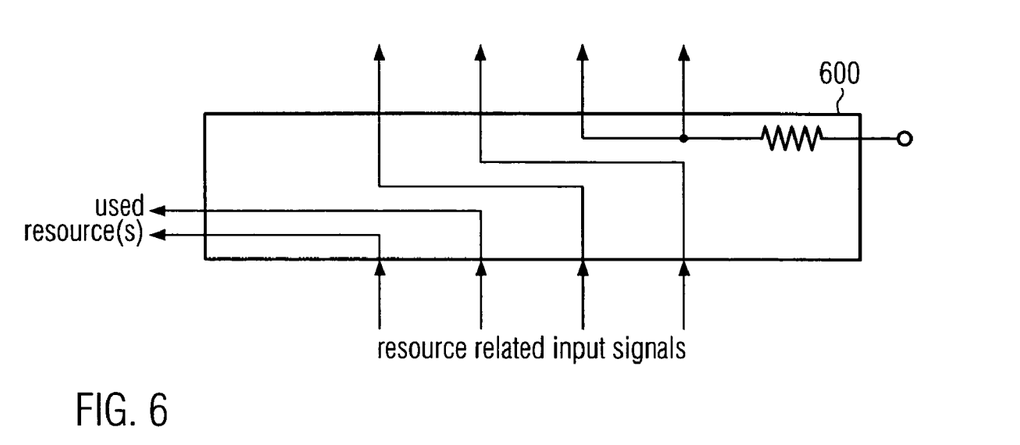
FIG. 6 illustrates a stackable module according to yet another embodiment.

FIG. 6 illustrates an example where the module 600 takes out two resource related input signals, and the remaining signals are shifted by two port positions. Further embodiments exist where three, four, five or more resource related input signals are used in each module.

Figure 7:
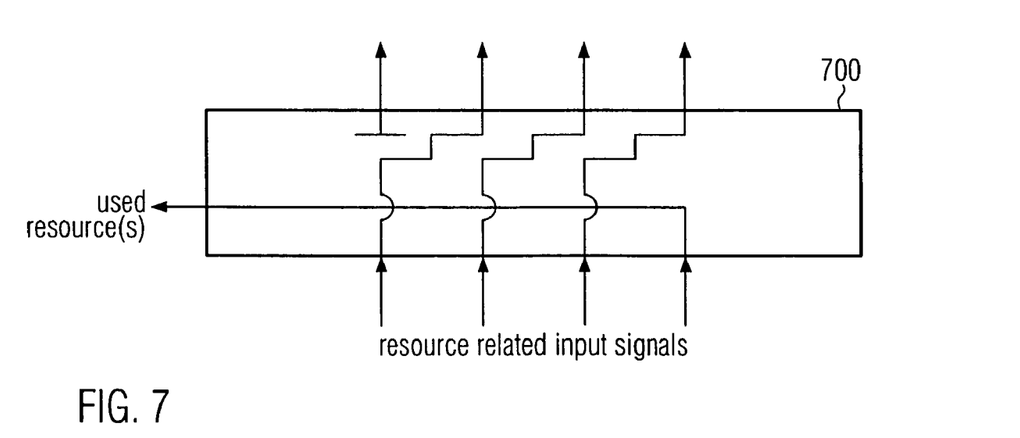
FIG. 7 illustrates a stackable module according to a further embodiment.

While it was discussed above that each module takes out the first signal(s), other embodiments may use the last signal(s). This is depicted in an embodiment in FIG. 7, where module 700 uses the last input signal and shifts the remaining input signals by one port position to the right. Thus, the first output port is then connected to a predefined signal source.

It is noted that in other embodiments, other predefined port positions may be used by the modules, even if these ports are located somewhere in the middle.

The above-discussed embodiments may for instance be used for assigning resources which require a point-to-point connection in stacked bus systems. It is to be noted that such resources are not restricted to clocks and chip selects, but may include any other point-to-point connection.

As discussed above, all of the modules are of the same construction in the described examples. This allows same circuitry to be duplicated for all memory interfaces, thereby allowing the implementation of any combination of memory banks in composite devices. A 2-wire configuration EEPROM (Electrically Erasable Programmable Read-Only Memory) may be used to describe the memory banks. The software can then discover the resource assignment in effect.

While the above embodiments have discussed clock signals, chip select signals and other point-to-point resources, further embodiments may use address signals as resource signals to allow a configuration-free address allocation for stacked modules in bus systems or other stacked module devices. As will be described in more detail below, the embodiments allow for distributing addresses to stacked modules with or without logical gates, particularly with only a single gate and/or with low additional efforts.

Generally, every module may have n address input bits $a_0$ to $a_{n-1}$ and the same number of address output bits $b_0$ to $b_{n-1}$ where the output $b_0$ to $b_{n-1}$ may be calculated by a logical function and where the input address $[a_0, a_{n-1}]$ or the output address $[b_0, b_{n-1}]$ is used as an address on the current stack.

Figure 8:
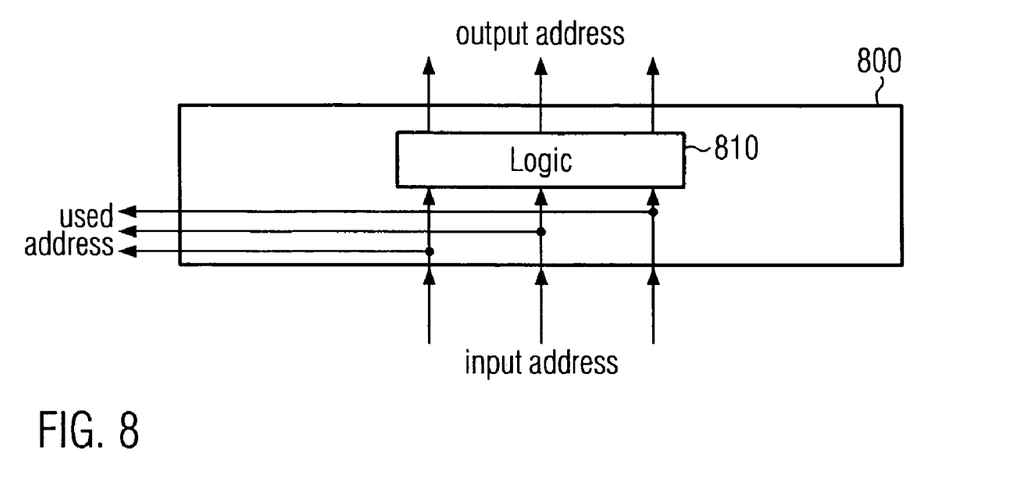
FIG. 8 illustrates yet another stackable module according to an embodiment.
Figure 9:
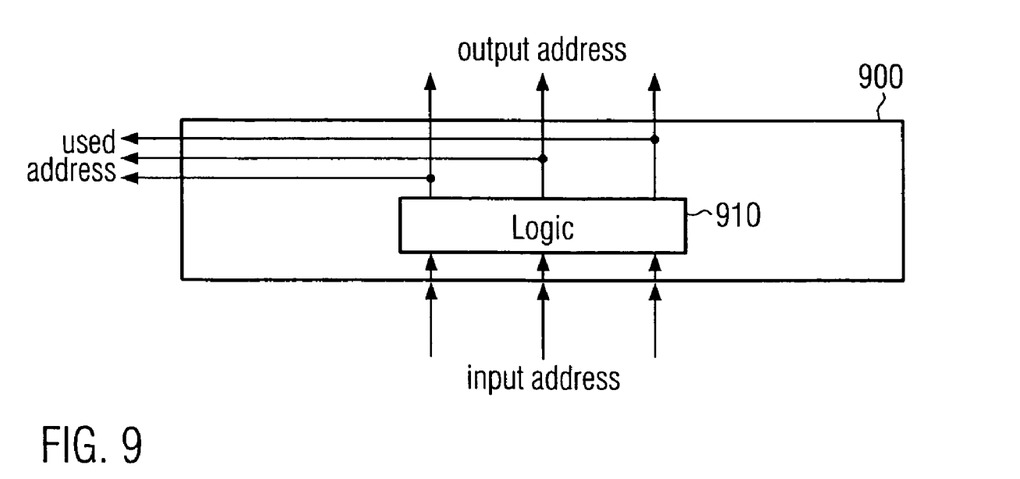
FIG. 9 illustrates a further stackable module according to an embodiment.

For instance, referring to FIGS. 8 and 9, the module 800 receives three input address signals forming an input address. The module 800 uses this input address in the stack. Further, the module has a logic 810, which has in the embodiment zero or one logic gate, to generate an output address from the input address. The output address is then provided to the next upper module.

The embodiment of FIG. 9 differs from that of FIG. 8 in that the model 900 does not use the input address by itself, but the output address.

As will be described in more detail below, when shifting address lines and using a single gate, up to seven modules can get individual addresses in a three-bit address bus. The amount of distinguishable modules depends on the kind of gate used. In the three-bit address bus example, four addresses may be distinguished when not using any logical gate, six addresses may be distinguished when using a NOT gate, and seven addresses may be used when having an XOR or XNOR gate.

Discussing first an embodiment where logic 810, 910 is a binary adder, the address is incremented by one from module to module. For a three-bit address bus, the use of an adder logic may then lead to eight individually addressable modules.

Figure 10:
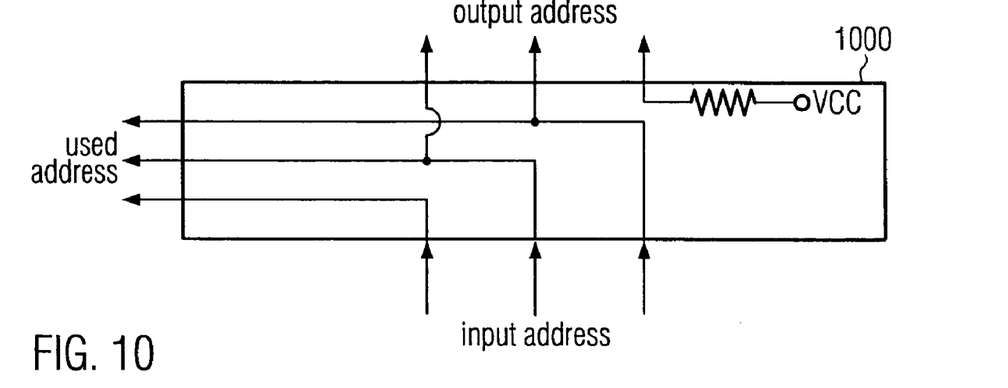
FIG. 10 illustrates still a further stackable module according to an embodiment.

A much more simple implementation is shown in FIG. 10, where the logic 810 has no logical gate. Rather, the second input address bit is sent to the first output address port, the third input address bit is forwarded to the second output address port, and the third output port is connected to a predefined signal source.

The (binary and decimal) addresses resulting from the arrangement of FIG. 10 for each stack position is shown in the following table (assuming the most significant bit to be present at the first port):

| Stack position | Address bin | Address dec |
|---|---|---|
| 1 | 000 | 0 |
| 2 | 001 | 1 |
| 3 | 011 | 3 |
| 4 | 111 | 7 |

The bit mapping performed by module 1000 shown in FIG. 10 between the input address and the output address is given in the following table:

| Address in | | | Address out | | |
|---|---|---|---|---|---|
| $a_2$ | $a_1$ | $a_0$ | $b_2$ | $b_1$ | $b_0$ |
| 0 | 0 | 0 | 0 | 0 | 1 |
| 0 | 0 | 1 | 0 | 1 | 1 |
| 0 | 1 | 1 | 1 | 1 | 1 |
| 1 | 1 | 1 | 1 | 1 | 1 |

The corresponding function equations for module 1000 are given by the following formulas:

$AD_0 = a_0$ $AD_1 = a_1$ $AD_2 = a_2$ $b_0 = 1$ $b_1 = a_0$ $b_2 = a_1$

Where $AD_i$ denotes the address bits provided by the host board.

Figure 11:
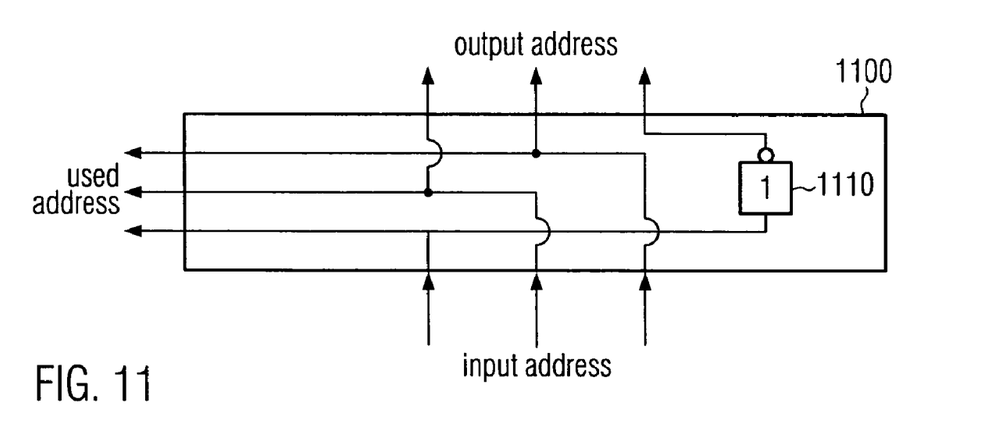
FIG. 11 illustrates a stackable module according to yet another embodiment.

Referring now to FIG. 11, a module 1100 is shown having a single NOT gate 1110. As discussed with reference to FIG. 10, the address bits received at the second and third input ports are shifted by one port position. However, the remaining output port is supplied with the inverted bit received at the first input port. This leads to the following address assignment:

| Stack position | Address bin | Address dec |
|---|---|---|
| 1 | 000 | 0 |
| 2 | 001 | 1 |
| 3 | 011 | 3 |
| 4 | 111 | 7 |
| 5 | 110 | 6 |
| 6 | 100 | 4 |

The corresponding address bit mapping is shown in the following table:

| Address in | | | Address out | | |
|---|---|---|---|---|---|
| $a_2$ | $a_1$ | $a_0$ | $b_2$ | $b_1$ | $b_0$ |
| 0 | 0 | 0 | 0 | 0 | 1 |
| 0 | 0 | 1 | 0 | 1 | 1 |
| 0 | 1 | 1 | 1 | 1 | 1 |
| 1 | 1 | 1 | 1 | 1 | 0 |
| 1 | 1 | 0 | 1 | 0 | 0 |
| 1 | 0 | 0 | 0 | 0 | 0 |

Figure 12:
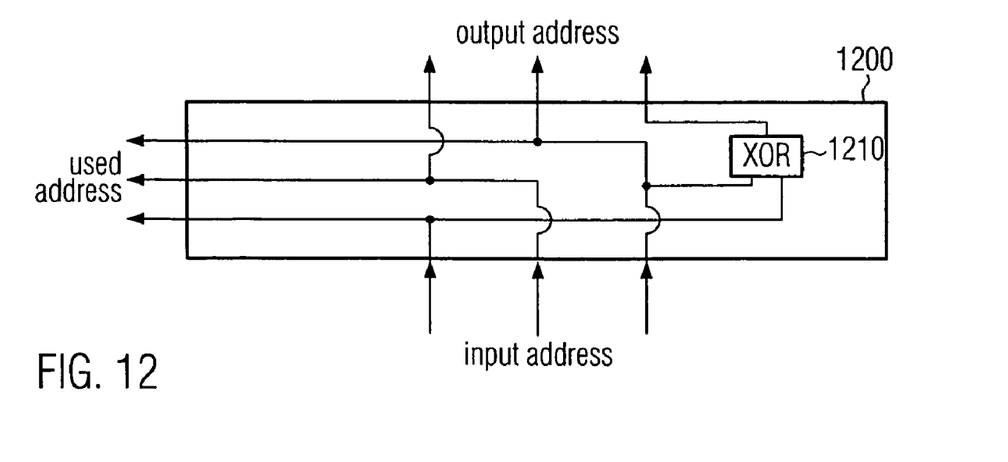
FIG. 12 illustrates a stackable module according to still a further embodiment.

The function equations for the described module having a single NOT gate is as $AD_0 = a_0$ $AD_1 = a_1$ $AD_2 = a_2$ $b_0 = \overline{a_2}$ $b_1 = a_0$ $b_2 = a_1$ FIG. 12 shows another embodiment where the module 1200 has an XOR gate 1210. The resulting stack addresses and address functions are the following:

| Stack position | Address bin | Address dec |
|---|---|---|
| 1 | 001 | 1 |
| 2 | 011 | 3 |
| 3 | 111 | 7 |
| 4 | 110 | 6 |
| 5 | 101 | 5 |
| 6 | 010 | 2 |
| 7 | 100 | 4 |

| Address in | | | Address out | | |
|---|---|---|---|---|---|
| $a_2$ | $a_1$ | $a_0$ | $b_2$ | $b_1$ | $b_0$ |
| 0 | 0 | 1 | 0 | 1 | 1 |
| 0 | 1 | 1 | 1 | 1 | 1 |
| 1 | 1 | 1 | 1 | 1 | 0 |
| 1 | 1 | 0 | 1 | 0 | 1 |
| 1 | 0 | 1 | 0 | 1 | 0 |
| 0 | 1 | 0 | 1 | 0 | 0 |
| 1 | 0 | 0 | 0 | 0 | 1 |

Figure 13:
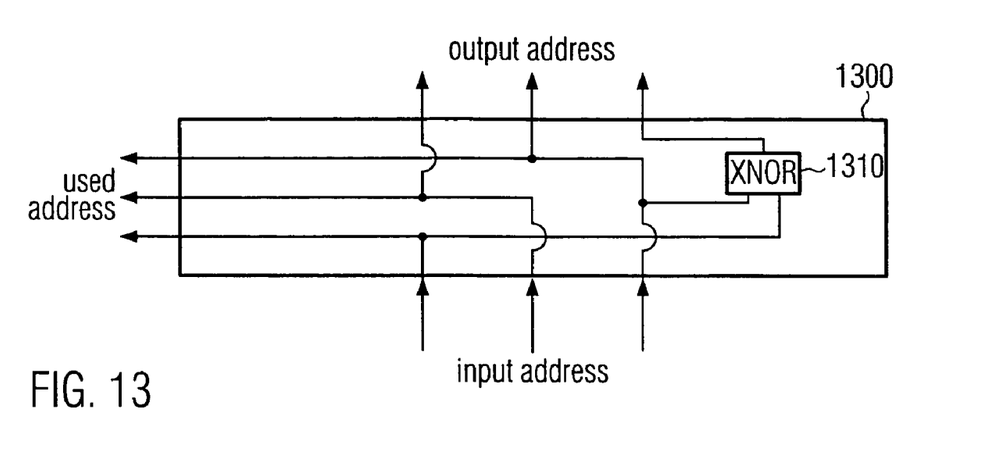
FIG. 13 illustrates a stackable module according to another embodiment.

$AD_0 = a_0$ $AD_1 = a_1$ $AD_2 = a_2$ $b_0 = (\overline{a_0} \wedge a_2) \vee (a_0 \wedge \overline{a_2})$ $b_1 = a_0$ $b_2 = a_1$ A similar result is achieved by using an XNOR gate 1310 in the module 1300 shown in FIG. 13.

| Stack position | Address bin | Address dec |
|---|---|---|
| 1 | 000 | 0 |
| 2 | 001 | 1 |
| 3 | 010 | 2 |
| 4 | 101 | 5 |
| 5 | 011 | 3 |
| 6 | 110 | 6 |
| 7 | 100 | 4 |

| Address in | | | Address out | | |
|---|---|---|---|---|---|
| $a_2$ | $a_1$ | $a_0$ | $b_2$ | $b_1$ | $b_0$ |
| 0 | 0 | 0 | 0 | 0 | 1 |
| 0 | 0 | 1 | 0 | 1 | 0 |
| 0 | 1 | 0 | 1 | 0 | 1 |
| 1 | 0 | 1 | 0 | 1 | 1 |
| 0 | 1 | 1 | 1 | 1 | 0 |
| 1 | 1 | 0 | 1 | 0 | 0 |
| 1 | 0 | 0 | 0 | 0 | 0 |

$AD_0 = a_0$ $AD_1 = a_1$ $AD_2 = a_2$ $b_0 = (a_0 \wedge a_2) \vee (\overline{a_0} \wedge \overline{a_2})$ $b_1 = a_0$ $b_1 = a_1$ Thus, when having no logical gate, four modules can be distinguished. Using a NOT gate, six modules can be distinguished. Using an XOR or XNOR gate, seven modules can be distinguished, and using an adder logic, up to eight modules can be individually addressed.

In any of the above embodiments, the number of resource related input signals, such as the number of address bits, may be arbitrarily chosen and may in particular differ from the number of modules. Further, in the arrangements of FIGS. 8 to 13, it is possible to have the least significant bits at the highest port positions while having the most significant bits at the lowest port positions, but other embodiments may have other port assignments.

In an embodiment, the number of modules is chosen not to exceed two to the power of the number of address bits, in order to allow each module to get assigned a unique address.

Further, in any of the above embodiments, a 2-wire configuration EEPROM may be used. This may allow for an automatic chip select/clock assignment for all memory interfaces, and for an automatic 2-wire address generation. Further, embodiments may exist where software can determine the stacked configuration from the 2-wire EEPROMs, and the software can then adjust memory controller settings based on parameters read from the 2-wire EEPROMs.

In a further embodiment, there may be provided an I/O (input/output) expander that may use the same 2-wire address as the EEPROM. The I/O expander may be combined with the 2-wire EEPROM. In an embodiment, after reset, all input and output ports are high, i.e., the addresses are set to zero. The bottom-most module then replies to the 2-wire address zero while all other modules reply to 2-wire address seven.

Figure 14:
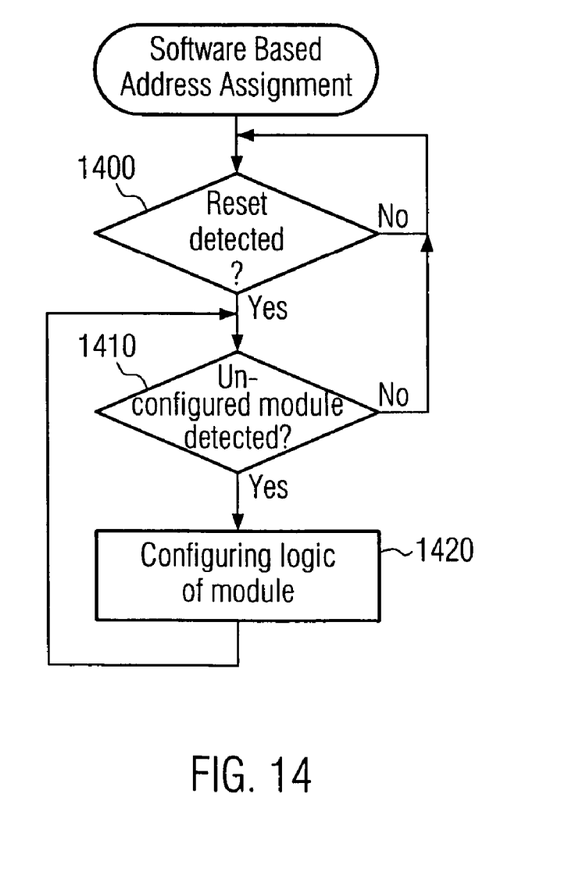
FIG. 14 is a flow chart illustrating an iterative method of performing a software based address assignment according to an embodiment.

FIG. 14 depicts a flow chart that may be used for software configuration. After reset is detected in step 1400, the software detects in step 1410 whether the bottom-most module exists. If so, the I/O expander which may be an 8-bit I/O expander, is configured in step 1420 to drive an upper-side address of one. The second module will then respond to the address one, and the software can then configure this module to provide an output address of two. By reiterating, the software continues assigning incremented addresses until it reaches the end of the stack. This may be a process which is executed once after hardware reset.

While the invention has been described with respect to the physical embodiments constructed in accordance therewith, it will be apparent to those skilled in the art that various modifications, variations and improvements of the present invention may be made in the light of the above teachings and within the purview of the appended claims without departing from the spirit and intended scope of the invention. In addition, those areas in which it is believed that those of ordinary skill in the art are familiar, have not been described herein in order to not unnecessarily obscure the invention described herein. Accordingly, it is to be understood that the invention is not to be limited by the specific illustrative embodiments, but only by the scope of the appended claims.

What is claimed is:

1. A device having stacked modules, at least some of said modules having input ports connected to receive first resource related signals from a first neighbouring module, and output ports connected to provide second resource related signals to a second neighbouring module, said second resource related signals being different from said first resource related signals, each one of said at least some modules comprising a resource signal transformation unit adapted to generate said second resource related signals from said first resource related signals, the resource signal transformation units of each one of said at least some modules being of the same construction, wherein the resource signal transformation unit of each one of said at least some modules is configurable by software.

2. The device of claim 1, wherein said first and second resource related signals are address signals.

3. The device of claim 2, wherein each one of said at least some modules is assigned the address represented by said first resource related signals.

4. The device of claim 2, wherein each one of said at least some modules is assigned the address represented by said second resource related signals.

5. The device of claim 2, wherein each input and output port is assigned to one address bit of the respective address.

6. The device of claim 2, wherein said resource signal transformation unit is implemented by directly connecting each output port to either an individual one of said input ports or to a signal source providing a predefined signal level.

7. The device of claim 2, wherein said resource signal transformation unit comprises at least one logic gate connected to at least one input port to modify at least one first resource related signal before being forwarded to an output port.

8. The device of claim 7, wherein said resource signal transformation unit is adapted to add a predefined value to an address represented by said first resource related signals to generate said second resource related signals.

9. A device having stacked modules, at least some of said modules having input ports connected to receive first resource related signals from a first neighboring module, and output ports connected to provide second resource related signals to a second neighboring module, said second resource related signals being different from said first resource related signals, each one of said at least some modules comprising a resource signal transformation unit adapted to generate said second resource related signals from said first resource related signals, the resource signal transformation units of each one of said at least some modules being of the same construction, wherein said first and second resource related signals are address signals, wherein said resource signal transformation unit comprises at least one logic gate connected to at least one input port to modify at least one first resource related signal before being forwarded to an output port, and wherein said at least one logic gate is a NOT gate connected to receive a first resource related signal from an input port and provide an inverted signal to an output port not corresponding to said input port in the arrangement of ports.

10. The device of claim 7, wherein said at least one logic gate is an XOR gate connected to receive two first resource related signals from two input ports and provide an XOR'ed signal to an output port.

11. A device having stacked modules, at least some of said modules having input ports connected to receive first resource related signals from a first neighboring module, and output ports connected to provide second resource related signals to a second neighboring module, said second resource related signals being different from said first resource related signals, each one of said at least some modules comprising a resource signal transformation unit adapted to generate said second resource related signals from said first resource related signals, the resource signal transformation units of each one of said at least some modules being of the same construction, wherein said first and second resource related signals are address signals, wherein said resource signal transformation unit comprises at least one logic gate connected to at least one input port to modify at least one first resource related signal before being forwarded to an output port, and wherein said at least one logic gate is an XNOR gate connected to receive two first resource related signals from two input ports and provide an XNOR'ed signal to an output port.

12. The device of claim 1, being a stacked bus system.

13. The device of claim 1, wherein for each one of said at least some modules, the number of input ports is the same as the number of output ports.

14. A device having stacked modules, at least some of said modules having input ports connected to receive first resource related signals from a first neighboring module, and output ports connected to provide second resource related signals to a second neighboring module, said second resource related signals being different from said first resource related signals, each one of said at least some modules comprising a resource signal transformation unit adapted to generate said second resource related signals from said first resource related signals, the resource signal transformation units of each one of said at least some modules being of the same construction, wherein the number of stacked modules is the same as the number of input ports.

15. The device of claim 1, wherein the number of stacked modules is different from the number of input ports.

16. The device of claim 1, wherein said first neighbouring module is the next lower module in the stack, and said second neighbouring module is the next higher module in the stack.

17. The device of claim 1, wherein said first neighbouring module is the next higher module in the stack, and said second neighbouring module is the next lower module in the stack.

18. A device having stacked modules, at least some of said modules having input ports connected to receive first resource related signals from a first neighboring module, and output ports connected to provide second resource related signals to a second neighboring module, said second resource related signals being different from said first resource related signals, each one of said at least some modules comprising a resource signal transformation unit adapted to generate said second resource related signals from said first resource related signals, the resource signal transformation units of each one of said at least some modules being of the same construction, wherein said resources are clock signals.

19. The device of claim 1, wherein said resources are chip select signals.

20. A device having stacked modules, at least some of said modules having input ports connected to receive first resource related signals from a first neighboring module, and output ports connected to provide second resource related signals to a second neighboring module, said second resource related signals being different from said first resource related signals, each one of said at least some modules comprising a resource signal transformation unit adapted to generate said second resource related signals from said first resource related signals, the resource signal transformation units of each one of said at least some modules being of the same construction, wherein at least one of said modules comprises a memory, and wherein said memory is a 2-wire EEPROM (Electrically Erasable Programmable Read Only Memory).

21. A module stackable into or onto a module stack device, the stackable module having input ports connected to receive first resource related signals from a first neighbouring module, and output ports connected to provide second resource related signals to a second neighbouring module, said second resource related signals being different from said first resource related signals, each one of said at least some modules comprising a resource signal transformation unit adapted to generate said second resource related signals from said first resource related signals, the resource signal transformation units of each one of said at least some modules being of the same construction, wherein the resource signal transformation unit of each one of said at least some modules is configurable by software.

22. A method of operating a device having stacked modules, comprising, in at least some of said modules:

receiving first resource related signals at input ports of the respective module from a first neighbouring module;

generating second resource related signals from said first resource related signals, said second resource related signals being different from said first resource related signals; and providing said second resource related signals at output ports of the respective module to a second neighbouring module, wherein generating said second resource related signals from said first resource related signals comprises operating a resource signal transformation unit which is of the same construction in each one of said at least some modules; and configuring the resource signal transformation unit of each one of said at least some modules by software.

* * * * *